United States Patent
Wörner et al.

(10) Patent No.: US 6,822,774 B2
(45) Date of Patent: Nov. 23, 2004

(54) OPTOELECTRONIC DEVICE

(75) Inventors: Jörg Wörner, Weilheim/Tech (DE); Armin Claus, Nürtingen (DE)

(73) Assignee: Leuze Electronic GmbH & Co., Owen/Tech (DE)

( * ) Notice: Subject to any disclaimer, the term of this patent is extended or adjusted under 35 U.S.C. 154(b) by 70 days.

(21) Appl. No.: 10/006,668

(22) Filed: Dec. 10, 2001

(65) Prior Publication Data

US 2003/0002123 A1 Jan. 2, 2003

(30) Foreign Application Priority Data

Jul. 2, 2001 (EP) .............................................. 01116015

(51) Int. Cl.⁷ ............................................... G02B 26/08
(52) U.S. Cl. ...................... 359/200; 359/198; 359/216; 359/217; 235/462.38; 235/462.39
(58) Field of Search ................................. 359/198, 200, 359/216–218, 199; 235/462.38–39; 310/90.5

(56) References Cited

U.S. PATENT DOCUMENTS

| 4,836,631 A | | 6/1989 | Shimazu et al. | |
| 5,420,713 A | * | 5/1995 | Kunii | 359/198 |
| 5,475,206 A | * | 12/1995 | Reddersen et al. | 235/462.39 |
| 5,528,022 A | | 6/1996 | Nakazawa | |
| 5,559,320 A | * | 9/1996 | Loya | 235/462.39 |
| 5,942,824 A | | 8/1999 | Shioya et al. | |
| 5,945,758 A | * | 8/1999 | Goltz et al. | 310/90 |
| 6,072,254 A | * | 6/2000 | Heib et al. | 310/68 B |

FOREIGN PATENT DOCUMENTS

EP 0 558 074 A1 9/1993

* cited by examiner

Primary Examiner—Audrey Chang
Assistant Examiner—Denise S. Allen
(74) Attorney, Agent, or Firm—Venable LLP; Catherine M. Voorhees

(57) ABSTRACT

An optoelectronic device for detecting labels with defined contrast patterns includes a transmitter for emitting light rays, a receiver for receiving light rays, as well as a deflection unit with a motor-driven polygonal mirror wheel. The transmitted light rays and the received light rays are guided over the polygonal mirror wheel in order to scan the labels and reassemble the label-reflected received light rays, respectively. The device furthermore is provided with an evaluation unit for evaluating electrical receiving signals converted from received light rays at the receiver. The motor for driving the polygonal mirror wheel has a drive shaft and is provided with a magnet that is an injection-molded part, which is formed onto the shaft and operates jointly with at least one coil.

17 Claims, 2 Drawing Sheets

OPTOELECTRONIC DEVICE

CROSS-REFERENCE TO RELATED APPLICATION

This application claims the priority of European Patent Application No. 01 116 015.7 filed Jul. 2, 2001, the disclosure of which is being incorporated herein by reference.

FIELD OF THE INVENTION

The invention relates to an optoelectronic device for detecting labels with defined contrast patterns. In particular, the optoelectronic device can be embodied as a barcode reader.

BACKGROUND OF THE INVENTION

Optoelectronic devices of this type comprise a transmitter for emitting light rays, a receiver for received light rays, as well as a deflection unit with a motor-driven polygonal mirror wheel. The transmitted light rays and the received light rays are guided over the polygonal mirror wheel. As a result of the rotational movement of the polygonal mirror wheel, the transmitted light rays are deflected such that they periodically sweep across an area where the labels are located.

The transmitted light rays are guided across the labels in order to scan the patterns thereon. The received light rays, which are reflected back by the labels, are amplitude modulated in accordance with the label contrast pattern. The correspondingly modulated receiving light signals at the receiver output are evaluated in an evaluation unit for detecting the labels.

The polygonal mirror wheel is motor-driven, so that the polygonal mirror wheel performs a rotational movement with a predetermined speed. Commercially available motors with an integrated motor control are normally used for this. The motor is additionally provided with a shaft. A mechanical holding fixture is attached to this shaft and the polygonal mirror wheel is mounted on the top of this fixture. For this, the polygonal mirror wheel preferably is provided with a mounting support for screwing on the holding fixture. The shaft itself is inserted into a bearing and is secured there with fastening means. The motor control is connected via cable to the evaluation unit, which is arranged on a separate printed circuit board. The cable end is provided with a contacting plug that is plugged into a corresponding socket on the evaluation unit.

The disadvantage of a deflection unit with this type of design is that it comprises a plurality of electrical and mechanical components. The assembly of these components is time-consuming and thus represents an undesirably high cost factor when producing the optoelectronic device. In addition, the tolerances of the individually produced components lead to problems with the accuracy of the deflection units produced in this way. Finally, deflection units with this type of design have an undesirably large structural size.

SUMMARY OF THE INVENTION

It is the object of the invention to develop a deflection unit for an optoelectronic device of the aforementioned type, which has the smallest possible structural size at the lowest possible production cost, and with a smaller number of production parts than known optoelectronic devices.

The features of the optoelectronic device according to the invention are designed to solve this problem. Advantageous embodiments and useful modifications of the invention are described in the claims.

The optoelectronic device according to the invention is used to detect labels with defined contrast patterns and comprises a transmitter for emitting light rays, a receiver for receiving light rays from a label and for generating receiving signals and a deflection unit with a motor-driven polygonal mirror wheel. The transmitted light rays are guided over the polygonal mirror wheel in order to scan the labels and the reflected, received light rays are also guided across the polygonal mirror wheel. The optoelectronic device according to the invention furthermore comprises an evaluation unit for evaluating the receiving signals present at the receiver. The motor for driving the polygonal mirror wheel has a drive shaft and is provided with a magnet, which is embodied as an injection-molded part. The magnet is molded onto the shaft and operates jointly with at least one coil.

One essential advantage of the device according to the invention is that the shaft with molded-on magnet forms an extremely compact structural unit that can be produced inexpensively. In particular, no additional adapters or the like are required to connect the drive shaft to the magnet. As a result, the motor for driving the polygonal mirror wheel can be produced efficiently with a small number of individual parts and with extremely small dimensions.

An additional advantage is that the shape of the magnet can be specified freely due to the injection-molding procedure, which forms the magnet. In particular, the outside contour of the magnet can be designed such that the polygonal mirror wheel is fitted directly onto the magnet and can be secured, for example, by gluing it on.

Separate mechanical means for attaching the polygonal mirror wheel to the magnet are not required according to the invention, which results in a further reduction of the individual parts and thus a further lowering of the assembly and material costs when producing the deflection unit. The size of the deflection unit is additionally reduced further with this type of design.

In one particularly advantageous embodiment of the invention, the motor is mounted directly on a printed circuit board with an integrated evaluation unit. As a result, the motor, which operates jointly with the coil, is thus actuated directly via this evaluation unit. Consequently, a separate motor control, as well as an electrical cable and plug connection between a motor control of this type and the evaluation unit may be dispensed with.

The drive shaft according to the invention rotates inside a bearing. The bearing is positioned inside a tube. In an embodiment of this type, the tube with the bearing for guiding the motor shaft and the coil, which operates jointly with the magnet, rest on the printed circuit board.

According to this embodiment, the motor shaft is inserted with its lower end into a bearing bore that opens up at the tube top. The motor shaft does not need to be secured inside the bearing, which is particularly advantageous as it is possible to dispense with additional means for securing.

As a result of this structure, the shaft can be moved in a longitudinal direction; but this movement is limited by an end stop, formed by a housing ceiling of the optoelectronic device. The housing ceiling is located close to the upper edge of the shaft, provided the shaft is in the desired position. If the shaft with magnet is moved upward inside the bearing bore, for example as a result of impact on the device, the end stop will push the shaft back to its desired position without this hindering the rotational movement of the deflection unit.

A device according to the invention of this type requires only a small number of mechanical and electronic individual components and as a result, can be produced inexpensively.

BRIEF DESCRIPTION OF THE DRAWINGS

These and other features and advantages will be further understood from the following detailed description of the preferred embodiment with reference to the accompanying drawings in which.

DETAILED DESCRIPTION OF THE INVENTION

Figure 1:
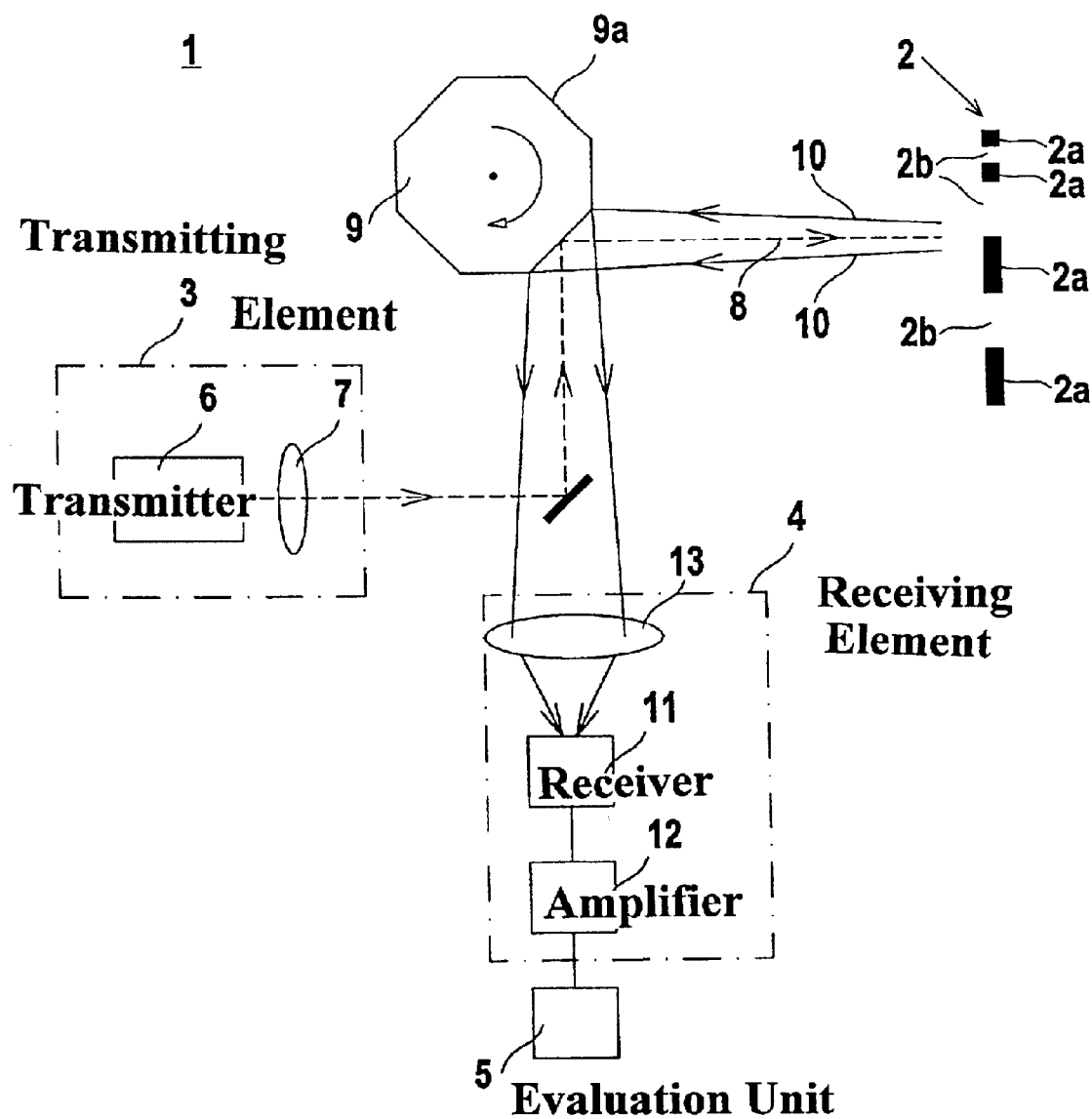
FIG. 1 illustrates, in schematic form, the basic layout of an optoelectronic device designed as barcode reader.

FIG. 1 shows the basic layout of an optoelectronic device 1 for detecting labels provided with defined contrast patterns. In principle, the labels can have optional sequences and shapes for adjoining light/dark areas, preferably black and white areas. Barcodes 2 form the labels for the present exemplary embodiment. The barcodes 2 essentially consist of a series of black and white line elements 2a, 2b with a defined length and width. The optoelectronic device 1 consequently is a barcode reader.

The optoelectronic device 1 comprises a transmitting element 3, a receiving element 4, as well as an evaluation unit 5. The transmitting element 3 consists of a transmitter 6, preferably a laser diode, as well as a transmitting optic 7 that is installed in front of the transmitter 6 and is designed to focus the transmitted light rays 8. The focused transmitted light rays 8 are deflected via a rotating polygonal mirror wheel 9 and are guided across the barcode symbol 2 to be detected. The rotational axis for the polygonal mirror wheel 9 is arranged perpendicular to the equatorial plane, shown in FIG. 2, of the polygonal mirror wheel 9. As a result of the rotational movement of the polygonal mirror wheel 9, the transmitted light rays 8 are periodically guided inside a predetermined angular range in the equatorial plane that forms the scanning plane. In the process, barcodes 2 can be read within a predetermined distance range, corresponding to the focusing of the transmitted light rays 8.

The polygonal mirror wheel 9 for the exemplary embodiment shown in FIG. 1 is provided with eight mirror surfaces 9a in the form of facets on which the transmitted light rays 8 are deflected. Corresponding to the number of facets of the polygonal mirror wheel 9, the transmitted light rays 8 periodically sweep across an angular range of $\Delta\alpha=90°$. With the arrangement shown in FIG. 1, the scanning plane in which the transmitted light rays 8 are guided is positioned in the equatorial plane of the polygonal mirror wheel 9.

The received light rays 10 that are reflected by the barcode 2 are guided over the polygonal mirror wheel 9 to the receiving element 4. The receiving element 4 consists of a receiver 11, which is designed as a photodiode and converts the received light rays 10 to an electrical receiving signal. An amplifier 12 is connected behind the receiver 11. A receiving optic 13 is connected in front of the receiving element 4 to improve the detection sensitivity. The receiving signal present at the output of receiver 4 is supplied to the evaluation unit 5.

In accordance with the contrast pattern for barcode 2, the received light rays 10 that are reflected on this barcode are amplitude modulated. The output electrical receiving signal indicating the received light rays 10 at the receiver 11 shows a corresponding amplitude modulation. Based on this amplitude modulation, the contrast pattern for the barcode 2 is reconstructed in the evaluation unit 5 with the aid of the receiving signals.

Figure 2:
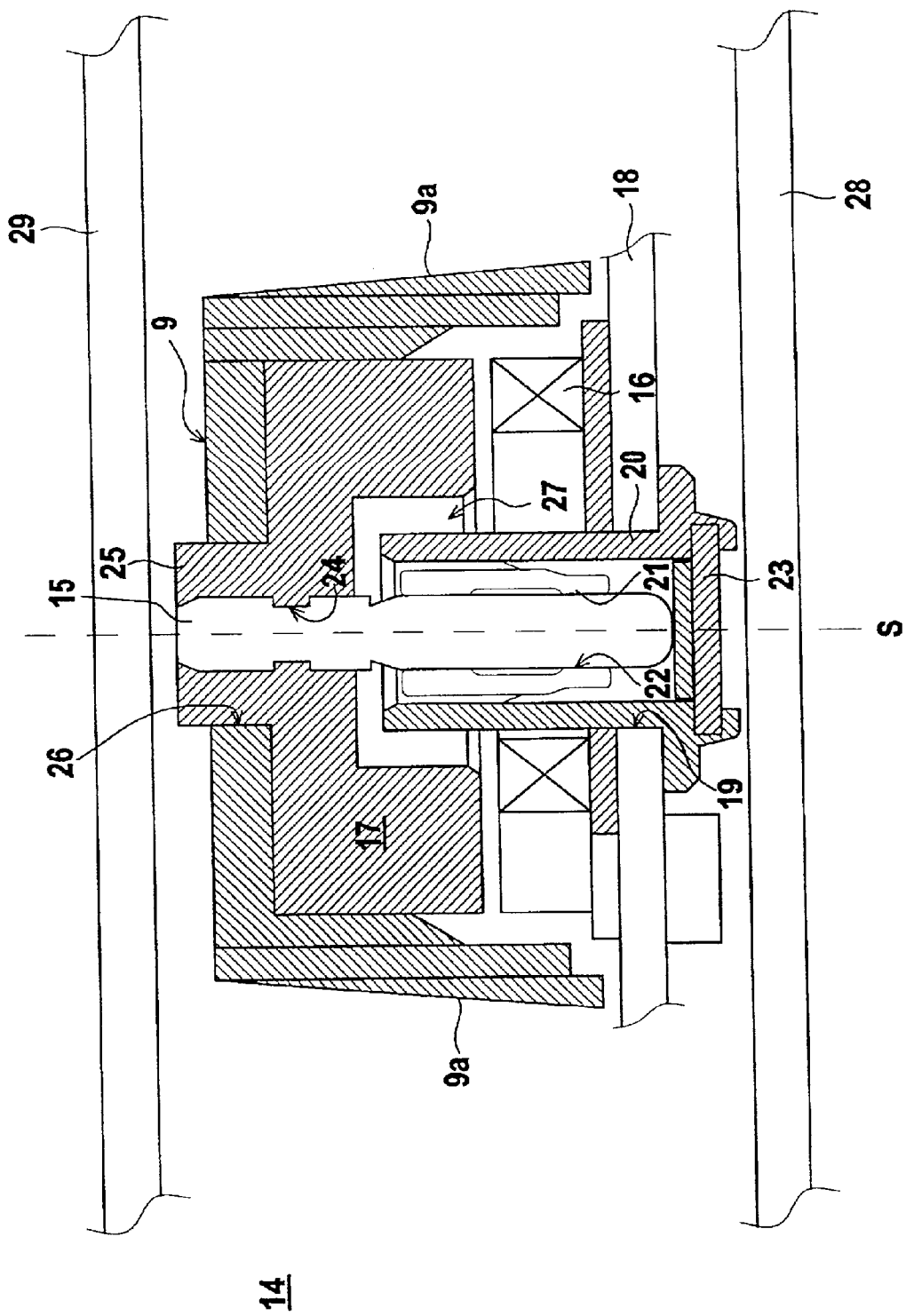
FIG. 2 is an exemplary embodiment of a deflection unit for the device according to FIG. 1.

FIG. 2 shows an exemplary embodiment of a deflection unit 14, of which the polygonal mirror wheel 9 according to FIG. 1 is a component. In addition, the deflection unit 14 comprises a motor for driving the polygonal mirror wheel 9, so that this wheel performs a rotational movement with a predetermined speed. This motor comprises a shaft 15, on which the polygonal mirror wheel 9 is rotationally positioned, as well as a coil 16 and a magnet 17 that operates jointly with this coil.

The motor is arranged on a printed circuit board 18 with an integrated evaluation unit 5. The motor is actuated directly via the evaluation unit 5, which is directly connected to the motor via printed circuit board 18. As a result, it is possible to dispense with separate electronic components and adapters for the motor control.

The printed circuit board 18 contains a bore 19. A tube 20, which projects perpendicularly from printed circuit board 18, is positioned inside bore 19. Tube 20 preferably is a hollow-cylindrical plastic part that is open on the top and the bottom. Alternatively, tube 20 may be made of metal.

A bearing 21 is secured inside tube 20, at the inside wall of tube 20. Bearing 21 is designed to accommodate shaft 15 and extends in a longitudinal direction of tube 20, along its symmetry axis S. Bearing 21 is preferably designed as a sliding bearing, ball bearing or roller bearing and is provided with a central bearing bore 22 that extends in the longitudinal direction of tube 20, symmetrical to the symmetry axis S of tube 20. An upper end of bearing bore 22 is adjacent the open top of tube 20. The bottom of tube 20 is closed off with a bottom part 23, which extends in a horizontal plane that is parallel to the plane of printed circuit board 18.

Magnet 17 is designed as injection-molded part and is molded onto shaft 15. For the injection-molded part, magnetic materials such as iron or the like are mixed into a molding material that can be poured, e.g. a plastic material, such that the magnetic materials are finely distributed with the molding material.

FIG. 2 shows magnet 17 molded onto the upper portion of shaft 15. To secure magnet 17 safely on shaft 15, the shaft is provided with a groove 24 extending in circumferential direction. The molding material that forms magnet 17 is injected into this groove.

Magnet 17 is a symmetrical molded part that encircles shaft 15. Polygonal mirror wheel 9 is fitted on top of and against the side surface of magnet 17. The top surface of magnet 17 is essentially a flat, circular-disk shaped area while the side surface of magnet 17 has a cylindrical shell surface.

One component of magnet 17 is an essentially hollow-cylindrical guide segment 25, which projects from the top surface of the molded part. Preferably, guide segment 25 may have a conical shell surface, wherein the outside diameter of guide segment 25 is tapered toward its upper edge. Guide segment 25 is arranged in the center of magnet 17 and is arranged symmetrical to the symmetry axis S of symmetrical magnet 17. The guide segment 25 encompasses the upper portion of shaft 15 and thus improves the support of magnet 17 on shaft 15. The top of guide segment 25 is level with the top of shaft 15.

Polygonal mirror wheel 9 may be an injection-molded plastic part with mirror surfaces 9a applied to its outer shell surface. Mirror surfaces 9a are applied, preferably by evaporating and depositing a light-reflecting layer thereon.

Polygonal mirror wheel 9 essentially is basically made from a circular disk segment and side walls of which project downward from edges of the disk segment to form a single unit together with the disk segment. The underside of the disk segment is mounted to the top surface of magnet 17. The insides of the side walls of polygonal mirror wheel 9 enclose a cylindrical hollow space, which is adapted to the outside contour of magnet 17.

The circular disk segment of the polygonal mirror wheel 9 is provided with a central, circular bore 26, the diameter of which is adapted to the outside diameter of the hollow-cylindrical guide segment 25 of magnet 17. The polygonal mirror wheel 9 is fitted onto magnet 17 for mounting the deflection unit 14 and is secured thereon with adhesive.

The underside of the circular disk segment of polygonal mirror wheel 9 is secured in this way on magnet 17, so that the insides of the side walls extending from the disk segment form-fit the outside contour magnet 17. Alternatively, polygonal mirror wheel 9 can be designed so that a space remains between the insides of the side walls for the polygonal mirror wheel 9 and the outside contour or shell surface of magnet 17. The guide segment 25 of the molded part that forms magnet 17 projects through the bore 26 in the circular disk segment, wherein the edges of the bore 26 fit closely against the guide segment 25.

Shaft 15 together with magnet 17 and polygonal mirror wheel 9, forms a single structural unit. Shaft 15 of the single structural unit is inserted into the bearing bore 22 of bearing 21 in order to mount deflection unit 14 on printed circuit board 18. FIG. 2 shows that once deflection unit 14 is fully installed, the lower end of shaft 15 rests on bottom 23 of tube 20.

The lengths of shaft 15 and the bearing 21 are dimensioned so that, when assembled, an air gap remains between the tube 20 and the coil 16 on the printed circuit board 18 and an air gap exists between coil 16 and the underside of the magnet 17. Thus, the rotation of the rotatably positioned structural unit including shaft 15, magnet 17 and polygonal mirror wheel 9 is not obstructed.

To keep the structural volume of deflection unit 14 as small as possible, the molded part that forms the magnet 17 is provided with a central, symmetrical recess 27. Recess 27 is formed at the lower edge of the molded part that faces coil 16 when assembled. Tube 20 projects into recess 27. As a result, a flat and space-saving design is obtained for deflection unit 14, despite the relatively large height of tube 20, resulting from the structural shape of the bearing 21.

The side walls of polygonal mirror wheel 9 project downward over magnet 17 and, in the process, partially cover the coil 16. As a result, it is possible to obtained sufficiently large mirror surfaces 9a for deflecting transmitted light rays 8 and received light rays 10, even with a relatively, flat structural shape for deflection unit 14.

Optoelectronic device 1 and deflection unit 14 may be integrated into one housing. In this case, the printed circuit board 18 with the motor arranged thereon rests on the housing bottom 28. The housing ceiling 29 extends just barely above the upper edge of the shaft 15.

This embodiment of optoelectronic device 1 is particularly advantageous, since the shaft 15 only need be inserted into bearing bore 22. That is, shaft 15 does not need to be secured on bearing 21.

In case of external interference, for example if impact stresses occur, shaft 15 can be moved to some degree upward inside bearing bore 22. However, this translational movement is limited by housing ceiling 29, which functions as an end stop. Since housing ceiling 29 extends just above the upper edge of shaft 15, small deflections of shaft 15 can push it against housing ceiling 29. As a result of the rebound and the attraction of the magnet toward coil 16, shaft 15 is returned to its starting position. Consequently, deflection unit 14 continues to rotate without any operational impairment.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An optoelectronic device for detecting labels with contrast patterns, said device comprising:
   a transmitter that emits light rays, said transmitted light rays scanning the contrast patterns of the labels;
   a receiver that receives light rays reflected by the labels and generates electrical receiving signals corresponding to the received light rays;
   an evaluation device for evaluating the electrical receiving signals at the receiver; and
   a deflection unit including a polygonal mirror wheel, and a motor that drives the polygonal mirror wheel, said transmitted light rays being guided over said polygonal mirror wheel to scan the contrast patterns of the labels and said received light rays being guided over said polygonal mirror wheel, wherein said motor has a shaft, an injected-molded magnet that is molded on said shaft and a coil, said coil being spaced from said magnet and said magnet operating jointly with said coil;
   a printed circuit board wherein said motor rests on said printed circuit board and said evaluation device is integrated into the printed circuit board and wherein said shaft rotates inside a bearing, said shaft being connected to said printed circuit board via said bearing; and
   a tube that projects from the top of said printed circuit board wherein said bearing is positioned inside said tube, wherein said shaft has an upper portion and a lower portion, said bearing is provided with a bearing bore that extends in an axial direction, and the lower portion of said shaft is inserted in the bearing bore.

2. An optoelectronic device according to claim 1, wherein said magnet is formed onto the upper portion of said shaft, the upper portion of said shaft extending above said bearing.

3. An optoelectronic device according to claim 2, wherein a groove is provided in the upper portion of said shaft, said groove extending in a circumferential direction around said shaft, a portion of said injected-molded magnet extending into said groove.

4. An optoelectronic device according to claim 3, wherein said shaft has a longitudinal axis and the magnet is formed symmetrically about the longitudinal axis of said shaft, said magnet having a top surface and side surfaces where said polygonal mirror wheel is fitted onto the top surface and against the side surfaces of said magnet.

5. An optoelectronic device according to claim 4, wherein said polygonal mirror wheel is glued onto said magnet.

6. An optoelectronic device according to claim 4, wherein said magnet has a lower edge that is positioned a distance from said coil, the lower edge of said magnet additionally being spaced from a portion of said tube that accommodates said bearing.

7. An optoelectronic device according to claim 6, wherein said magnet is provided with a central recess at its lower edge that is symmetrical to the longitudinal axis of said shaft, said tube projecting into the central recess.

8. An optoelectronic device according to claim 1, further comprising a housing with a bottom and a ceiling, wherein said transmitter, said receiver, said evaluation device and said deflection unit are surrounded by the housing, the combination of said printed circuit board and said motor resting on the housing bottom, and wherein the upper portion of said shaft has a top surface and the housing ceiling extends just above the top surface of said shaft.

9. An optoelectronic device according to claim 8, wherein said shaft is held inside said bearing and is displaceable in a longitudinal direction, the housing ceiling forming an end stop for said shaft.

10. An optoelectronic device for detecting labels with contrast patterns, said device comprising:
   a transmitter that emits light rays, said transmitted light rays scanning the contrast patterns of the labels;
   a receiver that receives light rays reflected by the labels and generates electrical receiving signals corresponding to the received light rays;
   an evaluation device for evaluating the electrical receiving signals at the receiver; and
   a deflection unit including a polygonal mirror wheel, and a motor that drives the polygonal mirror wheel, said transmitted light rays being guided over said polygonal mirror wheel to scan the contrast patterns of the labels and said received light rays being guided over said polygonal mirror wheel, wherein said motor has a shaft, an injected-molded magnet that is molded on said shaft and a coil, said coil being spaced from said magnet and said magnet operating jointly with said coil;
   a printed circuit board wherein said motor rests on said printed circuit board and said evaluation device is integrated into the printed circuit board and wherein said shaft rotates inside a bearing, said shaft being connected to said printed circuit board via said bearing; and
   a tube that projects from the top of said printed circuit board wherein said bearing is positioned inside said tube, said shaft has an upper portion and a lower portion, said bearing is provided with a bearing bore that extends in an axial direction, and the lower portion of said shaft is inserted in the bearing bore, wherein a groove is provided in the upper portion of said shaft so that said groove extends in a circumferential direction around said shaft and a portion of said injected-molded magnet extends into said groove, wherein said shaft has a longitudinal axis and the magnet is formed symmetrically about the longitudinal axis of said shaft, said magnet being formed onto the upper portion of said shaft, which extends above said bearing, said magnet having a top surface and side surfaces where said polygonal mirror wheel is fitted onto the top surface and against the side surfaces of said magnet and wherein said magnet has a guide segment projecting from its top surface, said guide segment enclosing the upper portion of said shaft.

11. An optoelectronic device according to claim 10, wherein the upper portion of said shaft has a top surface and the guide segment has a top surfaces, the top surfaces of said shaft and said guide segment adjoining so that they are flush with one another.

12. An optoelectronic device according to claim 10, wherein said polygonal minor wheel includes a circular disk segment and side walls that project downward from edges of the circular disk segment, the circular disk segment being provided with a central bore with circular cross-section, said guide segment being guided through the central bore.

13. An optoelectronic device according to claim 12, wherein the central bore of the circular disk segment fits flush against said guide segment.

14. An optoelectronic device for detecting labels with contrast patterns, said device comprising:
   a transmitter that emits light rays, said transmitted light rays scanning the contrast patterns of the labels;
   a receiver that receives light rays reflected by the labels and generates electrical receiving signals corresponding to the received light rays;
   an evaluation device for evaluating the electrical receiving signals at the receiver; and
   a deflection unit including a polygonal mirror wheel, and a motor that drives the polygonal mirror wheel, said transmitted light rays being guided over said polygonal mirror wheel to scan the contrast patterns of the labels and said received light rays being guided over said polygonal mirror wheel, wherein said motor has a shaft, an injected-molded magnet that is molded on said shaft and a coil, said coil being spaced from said magnet and said magnet operating jointly with said coil wherein the injected-molded magnet has an outside contour that is adapted to an inside contour of the polygonal mirror wheel so that the polygonal mirror wheel is directly fitted onto the injected-molded magnet.

15. An optoelectronic device according to claim 14, wherein said polygonal mirror wheel comprises an injection-molded plastic part and mirror surfaces provided on a shell surface of the plastic part for deflecting the transmitted light rays and the received light rays.

16. An optoelectronic device according to claim 15, wherein said polygonal mirror wheel includes a circular disk segment and side walls that project downward from edges of the circular disk segment, said mirror surfaces being deposited on the side walls that project downward from segment edge.

17. An optoelectronic device according to claim 16, wherein the circular disk segment of said polygonal mirror wheel rests on a top surface of said magnet.

* * * * *